United States Patent [19]

Meier-Burkamp et al.

[11] Patent Number: 5,810,139
[45] Date of Patent: Sep. 22, 1998

[54] BICYCLE AND A FRICTION DEVICE FOR CONTROLLING A CLAMPING ROLLER COUPLING OF A BICYCLE HUB OF A BICYCLE

[75] Inventors: Gerhard Meier-Burkamp, Bergrheinfeld; Karl-Joachim Kühne, Niederwerrn, both of Germany

[73] Assignee: Mannesmann Sachs AG, Schweinfurt, Germany

[21] Appl. No.: 850,042

[22] Filed: May 2, 1997

[30] Foreign Application Priority Data

May 3, 1996 [DE] Germany ............ 196 17 732.4

[51] Int. Cl.$^6$ ............ F16D 41/067; F16D 41/22; F16D 67/02; B62L 5/00
[52] U.S. Cl. ............ 192/6 A; 192/12 BA; 192/48.6; 192/64
[58] Field of Search ............ 192/6 A, 64, 48.4, 192/48.6, 17 D, 12 BA

[56] References Cited

U.S. PATENT DOCUMENTS

| | | |
|---|---|---|
| 4,046,238 | 9/1977 | Mendoza-Orozco . |
| 4,240,533 | 12/1980 | Fukui ........................... 192/6 A |
| 4,323,146 | 4/1982 | Fukui ........................... 192/6 A |

FOREIGN PATENT DOCUMENTS

| | | |
|---|---|---|
| 0573011 | 12/1993 | European Pat. Off. . |
| 817254 | 10/1951 | Germany . |
| 845016 | 7/1952 | Germany . |
| 4218409 | 12/1993 | Germany . |

*Primary Examiner*—Rodney H. Bonck
*Attorney, Agent, or Firm*—Nils H. Ljungman and Associates

[57] ABSTRACT

A friction device for controlling a clamping roller coupling for a drive device or for a back-pedal brake device connected to a bicycle hub can include a driving link with an ascending surface profile, at least one roll, a cage ring with cage arms, and an output link. The output link can be a brake jacket of the brake device. The brake device can be actuated by pedalling backword to tighten a friction spring on the hub axle. The friction spring can be realized as a loop spring, and a freewheel can be connected between the loop spring and the cage ring. The freewheel can include a first notch element non-rotatably connected to the cage ring, and a second notch element non-rotatably connected to the loop spring. When pedaling in the normal direction of rotation, the first and second notch elements are disengaged and torque is not transmitted to the loop spring. Upon back-pedalling, the first and second notch elements can non-rotatably engage to tighten the loop spring about the axle and transmit braking torque to the output link.

20 Claims, 4 Drawing Sheets

BICYCLE AND A FRICTION DEVICE FOR CONTROLLING A CLAMPING ROLLER COUPLING OF A BICYCLE HUB OF A BICYCLE

BACKGROUND OF THE INVENTION

1. Field of the Invention

The present invention relates generally to a friction device for controlling a clamping roller coupling for a drive device or for a back-pedal brake device for a bicycle hub of a bicycle. The friction device can include a driving link, which driving link can include one or more ascending surface profiles. The driving link can be placed around an axle of the bicycle. The friction device can also include a cage ring and at least one roll or roller. The cage ring can be connected to the axle by a friction spring.

2. Background Information

Friction devices in a drive or with back-pedal brake devices are known in connection with bicycle hubs. The friction devices are mostly used to hold a component in a certain direction or to transport the component in a certain direction with the aid of a low force component. For example, such a friction device is disclosed in German Patent No. 42 18 409 A1, wherein a friction spring, designed as a loop spring, is placed around a brake cone. The free end of the brake cone is connected, in a positive manner, to a brake cone that is fixed in the sense of rotation. The friction spring, designed as a loop spring, twines around the brake cone in such a way that, in case of actuation, the spring coil is bent open. As a result of bending open, the catch forces are low.

In the case of a reverse sense of rotation when braking, however, the coil placed around the brake cone draws tight and the catch force increases. This increased force prevents the brake cone from turning backward on a thread. As a result, an axial motion of the brake cone is caused. The inner component that is connected to the thread continues to turn backward. This classic case of an application of a friction spring, designed as a loop spring, can be disadvantageous in so far as, in the driving direction, brake power must always be overcome. In comparison with no-load hubs, overcoming the brake power can usually require more power when in operation for a longer time.

OBJECT OF THE INVENTION

Therefore, it is the object of the present invention to decrease, by additional measures, the holding forces of a friction spring toward zero in the driving direction, without sacrificing the advantages of the holding forces of the friction spring when pedalling backward.

SUMMARY OF THE INVENTION

The present invention teaches that, for a possible embodiment, a freewheel can be located between the friction spring and the cage ring. The freewheel can idle in one direction of rotation. The freewheel can catch in the opposite direction of rotation.

In another possible embodiment of the present invention, the friction spring can be a loop spring. The loop spring can be active in both the one direction of rotation of the freewheel and the opposite direction of rotation of the freewheel.

The present invention also teaches and shows the usage of a friction spring, the friction spring designed preferably as a loop spring, which loop spring can be placed around the axle of a multiple-gear hub. An end of the friction spring can be bent up as a hook, whereby the coils placed around the axle can generate relatively low backlog forces in the driving direction and relatively high backlog forces in the braking direction. The relatively low backlog forces of the friction spring in the driving direction can preferably be the forces eliminated to a relatively great extent by an additional freewheel.

The clamping roller coupling, which coupling for a possible embodiment of the present invention can be used as a brake device, can be activated when pedalling backward. The rolls can be captured in their position by cage arms on a cage ring, while an inner driving link with preferably an ascending surface profile can press the rolls outward against an outer driving link, or output link. The outer driving link can encompass the rolls, cage arms, and the inner driving link. The outer driving link can preferably be designed as a brake jacket.

The freewheel can be placed between the hook of the friction spring and the cage arms of the cage ring, whereby the transmission forces can go substantially toward zero in the driving direction. The freewheel can preferably include two discs, which two discs can lie against one another and can be connected by spring force. The two discs can preferably slide past one another, and the two discs can preferably be equipped with a notch device. One of the discs can be connected, unable to turn, to the hook of the friction spring. The other disc can be connected, preferably unable to turn, to the cage arms of the cage ring. The discs can preferably slide past one another in the driving direction, while the notches are being skipped. In the back-pedal sense of rotation, however, the notches can engage and can connect the cage arms to the hook of the friction spring in a positive manner, as a result of which positive engagement the rolls can be pressed against the outer driving link by the ascending surface profile of the inner driving component that turns backward. Attaching a freewheel for the purpose of reducing the holding force of the friction spring can offer the advantage of improved efficiency of the hub, which improved efficiency can benefit the user in all gear ratios when pedalling.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The example of an embodiment of a friction device for controlling a clamping roller coupling is illustrated in the following Figures, in which.

DESCRIPTION OF THE PREFERRED EMBODIMENT

Figure 1:
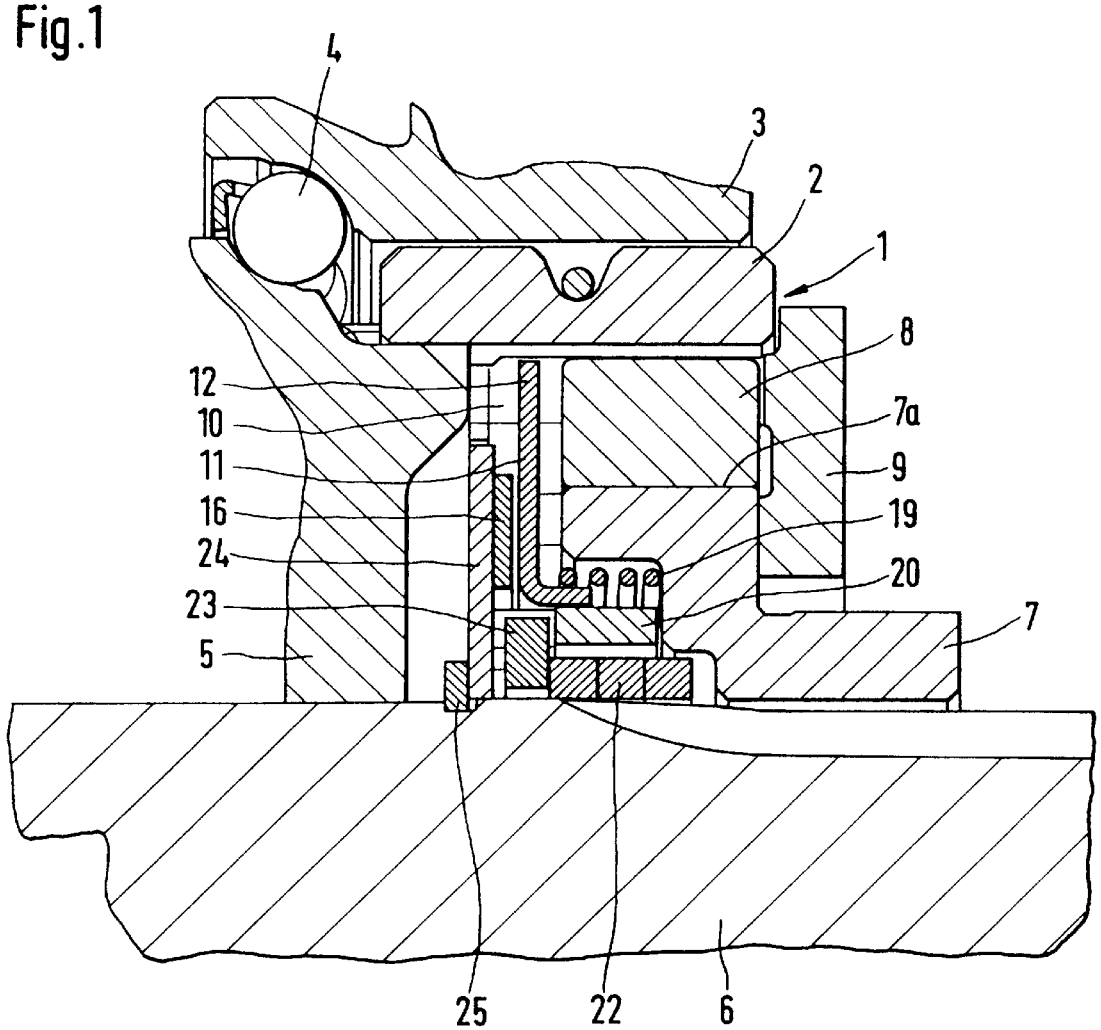
FIG. 1 illustrates a detail of a bicycle hub with an axle, a driving link, a roll, and an output link, in a partial longitudinal section.
Figure 1A:
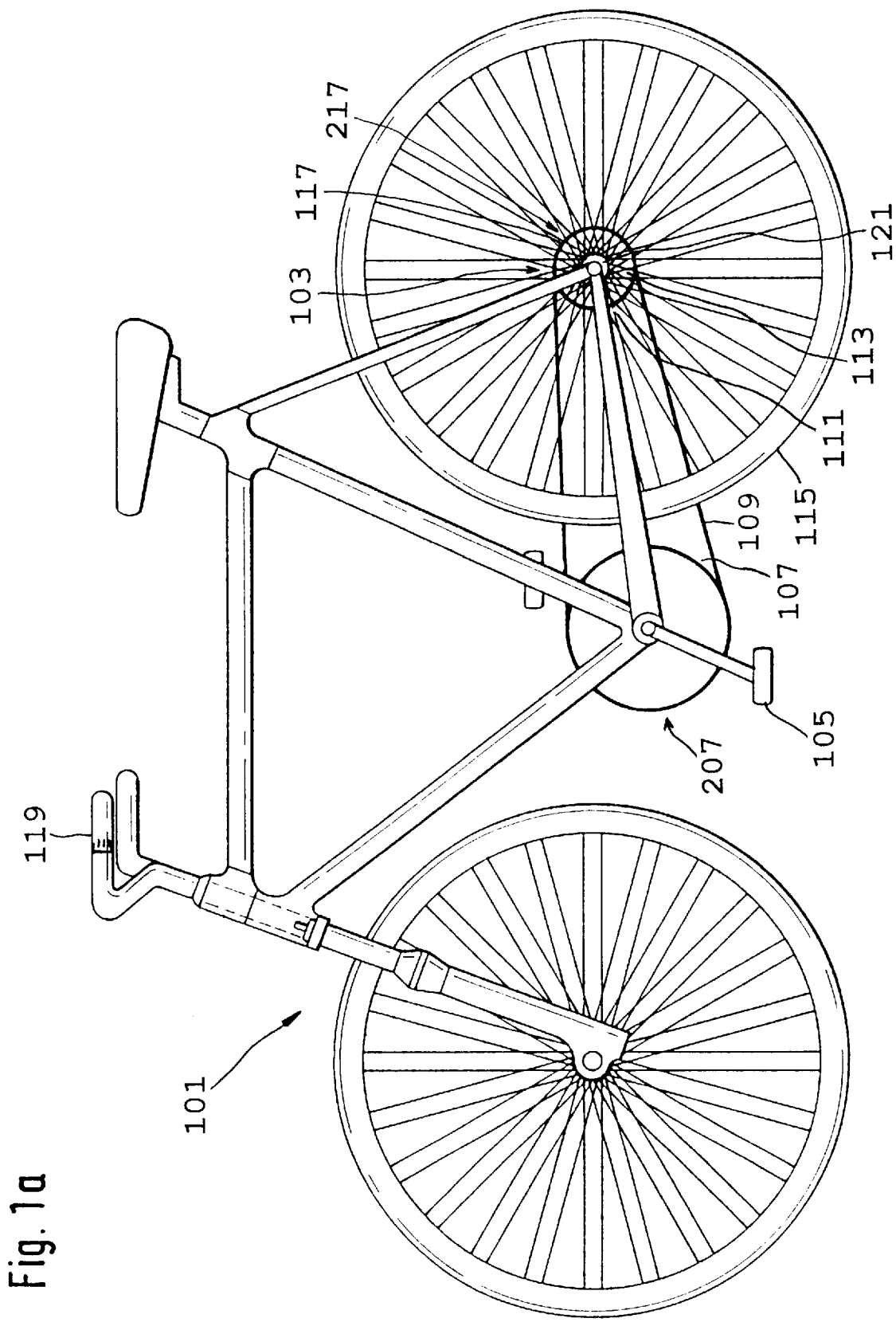
FIG. 1a schematically illustrates a bicycle for use in accordance with a possible embodiment of the present invention.

FIG. 1a schematically illustrates a bicycle 101 that could employ a friction device for controlling a clamping roller coupling in accordance with the present invention. The bicycle 101 can include pedals 105 to apply torque to a front sprocket 107. The front sprocket 107 can be a sole front sprocket 107, or can be the front sprocket 107 of a multiple front sprocket set 207. The front sprocket 107 can transmit torque to a chain 109, which chain 109 can be non-rotatably connected to a multi-gear hub 103. A wheel 115 can be mounted on the multi-gear hub 103 and the multi-gear hub 103 can transmit torque received from the chain 109 to the wheel 115.

The multi-gear hub 103 can include a torque input member 111 and a torque output member 113. The torque input member 111 can be non-rotatably connected to the chain 109 to receive torque, and torque can be transmitted from the torque input member 111 to the torque output member 113. The torque input member 111 can, for a possible embodiment of the present invention, include a rear sprocket 117. The rear sprocket 117 can be a sole rear sprocket 117 of the bicycle 101, or in a possible alternative embodiment of the present invention, be a rear sprocket 117 of a multiple rear sprocket set 217.

The wheel 115 can be mounted on the torque output member 113 to receive the torque transmitted from the pedals 105, and transmitted through the multi-gear hub 103. The multi-gear hub 103 can include gearing to vary the transmission ratio or rotation speed ratio between the torque input member 111 and the torque output member 113. The selection of the gear ratio of the multi-gear hub 103 can be controlled by a gear shifter 119 operatively connected to the multi-gear hub 103. Because multi-gear hubs and gear shifters are known, further detailed discussions of multi-gear hubs and gear shifts are omitted.

In one possible embodiment of the present invention, the pedals 105 can be rotated in a back-pedal direction to transmit braking torque and actuate a back-pedal brake device 121 of the multi-gear hub 103. In another possible embodiment of the present invention, the pedals 105 can be rotated in a forward-pedal direction to transmit driving torque to the multi-gear hub 103.

FIG. 1 illustrates a back-pedal brake device 1. The back-pedal brake device 1 can, for a possible embodiment, correspond to the back-pedal brake device 121 shown in FIG. 1a. The back-pedal brake device 1 can be placed on an axle 6 of a bicycle hub within a hub sheath 3 at one end of the bicycle hub. The bicycle hub can, for a possible embodiment, correspond to the bicycle hub 103 shown in FIG. 1a. As shown in FIG. 1, this back-pedal brake device 1 can include a driving link 7. The driving link 7 can have an ascending surface profile 7a, rollers or rolls 8, a cage ring 9 with cage arms 10, and an output link 2. The output link 2, preferably realized as a brake jacket, can be pressed against the hub sheath 3. The hub sheath 3 can be connected, on the side of the back-pedal brake device 1, to an axle 6 by means of a bearing 4 and a brake supporting ring 5.

In other words, for a possible embodiment of the present invention, the back-pedal brake device 1 can include a clamping roller coupling or overrunning clutch formed by the driving link 7, rolls or rollers 8, and the output link 2. The ascending surface profile or cam profile or pocket profile 7a can be configured to wedge the corresponding roller 8 between the driving link 7 and the output link 2 in a first direction of relative rotation between the driving link 7 and the output link 2.

Figure 2:
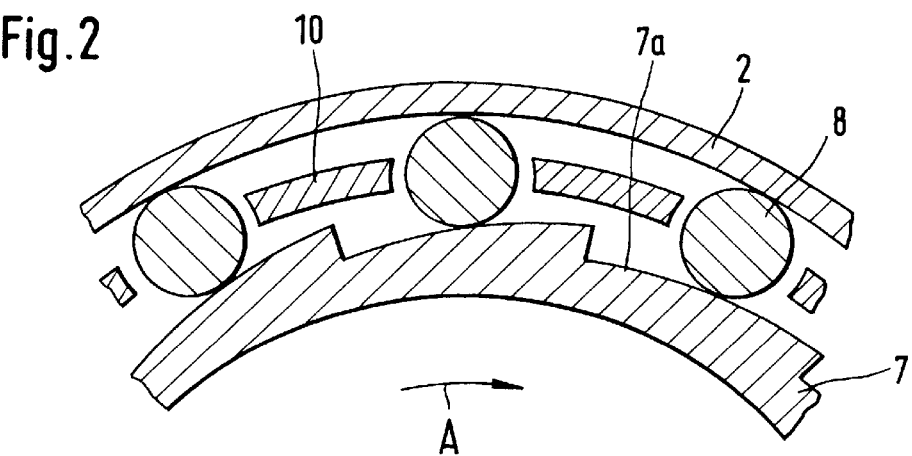
FIG. 2 illustrates the driving link with rolls and the output link, in a partial cross-section.

In FIG. 2, the placement of the clamping roller coupling between the driving link 7 and the output link 2 is illustrated. With rotary motion of the driving link 7 in the driving sense or direction of rotation A, the rolls 8 can get beyond a clamping engagement on the ascending surface profile 7a when the cage ring 9, the cage ring 9 having cage arms 10, can be held back against a driving sense of rotation A.

In other words, for a possible embodiment of the present invention, relative rotation of the driving link 7 with respect to the output link 2 in the counterclockwise direction (that is, in the direction opposite of rotation A) can wedge the corresponding roller 8 between the driving link 7 and the output link 2, thereby permitting the transfer of torque between the driving link 7 and the output link 2. Relative rotation of the driving link 7 with respect to the output link 2 in the clockwise direction (that is, in the direction of rotation A) can release the corresponding roller 8 from the cam profile 7a, permitting the output link 2 to overrun the driving link 7 and thereby in essence preventing the transfer of torque between the driving link 7 and the output link 2.

When pedalled to drive the bicycle, the driving link 7 can be driven in the direction of rotation A. Hence, each roller 8 can be released from wedging contact with the cam profile 7a. Each roller 8 can move along the cam profile 7a to a released position wherein each roller 8 is no longer wedged between the driving link 7 and the output link 2, in effect disconnecting the driving link 7 from the output link 2 as described above.

Figure 3:
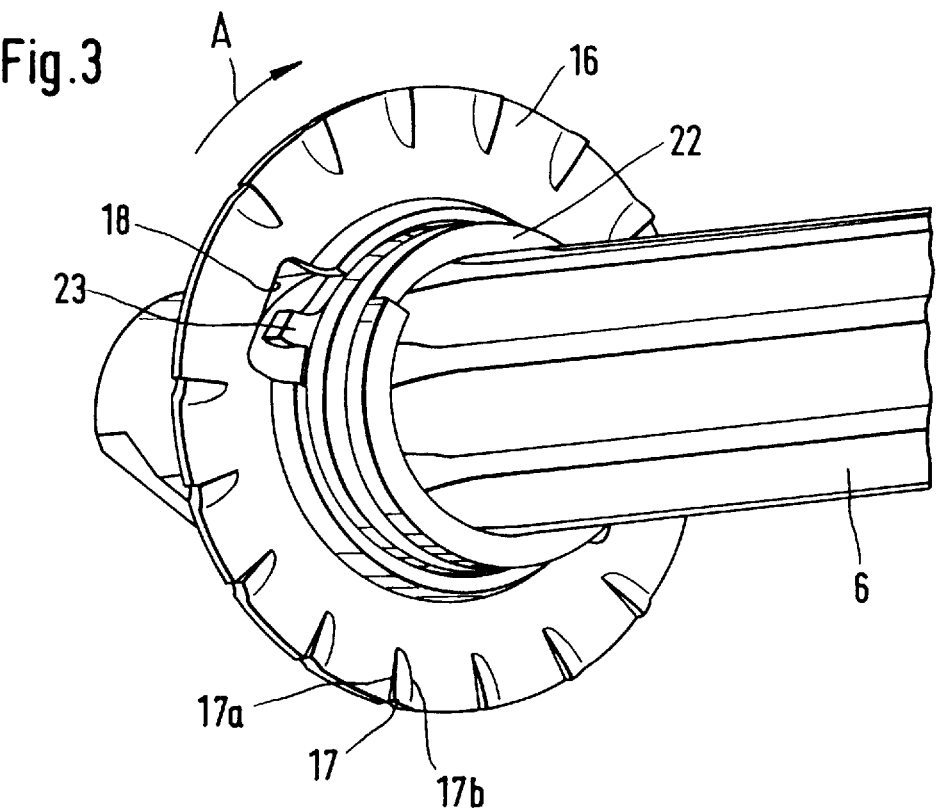
FIG. 3 illustrates the setup of a freewheel by applying a friction spring and a second notch element, in a perspective illustration.

This holding-back effect can be caused by a first notch element 11. The first notch element 11 can project with catches 12 between the cage arms 10. At the same time, as shown in FIG. 3, a friction spring 22, the friction spring 22 preferably being designed as a loop spring, can be placed around the axle 6. One of the ends of the loop spring 22 can be bent radially outward as a hook 23.

A second notch element 16 can be placed on the level of the hook 23. The second notch element 16 can be substantially vertical to the center axis of the axle 6. The second notch element 16 can include teeth 17. The teeth 17 can preferably be formed through shearing. The teeth 17 in the driving direction A can be placed pointing forward. The teeth 17 can have edges 17a in a radial manner. The teeth 17, on their back side, opposite the driving direction A, can each run back in the disk level by forming an incline 17b.

Figure 4:
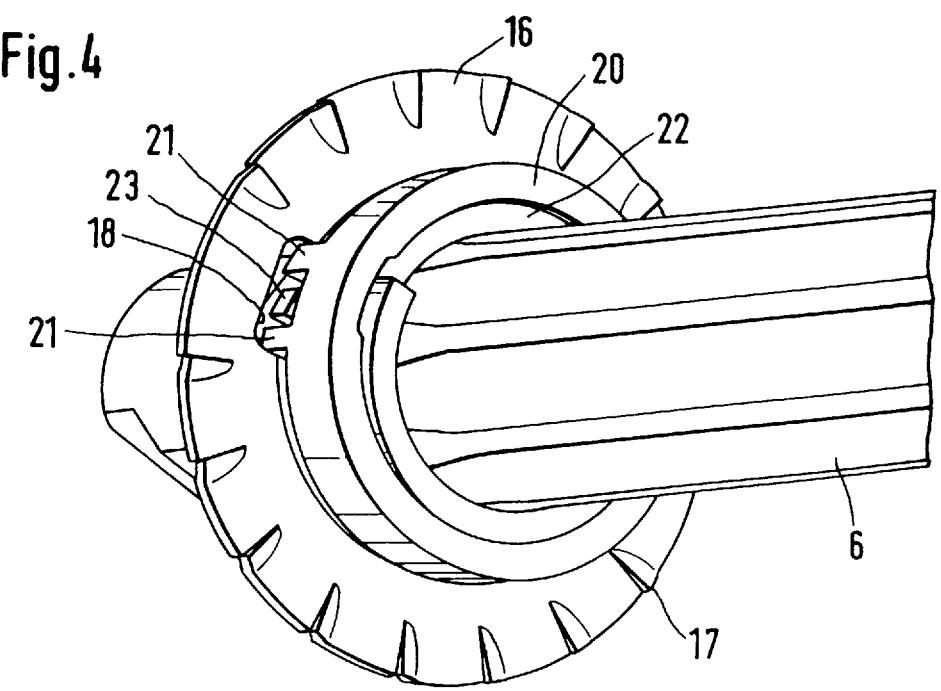
FIG. 4 is an illustration pursuant to FIG. 3 with the addition of a notch ring.

An opening 18 can be placed above the hook 23. The opening 18 can provide additional free space for two noses 21, as shown in FIG. 4. The two noses 21 can be positioned left and right of the hook 23, and the two noses 21 can substantially fill the opening 18. The noses 21 can belong to a notch ring 20 and can preferably project from the notch ring 20, which notch ring 20 can reach around the friction spring 22. The notch ring 20 can form a centering base for the first notch element 11.

Figure 5:
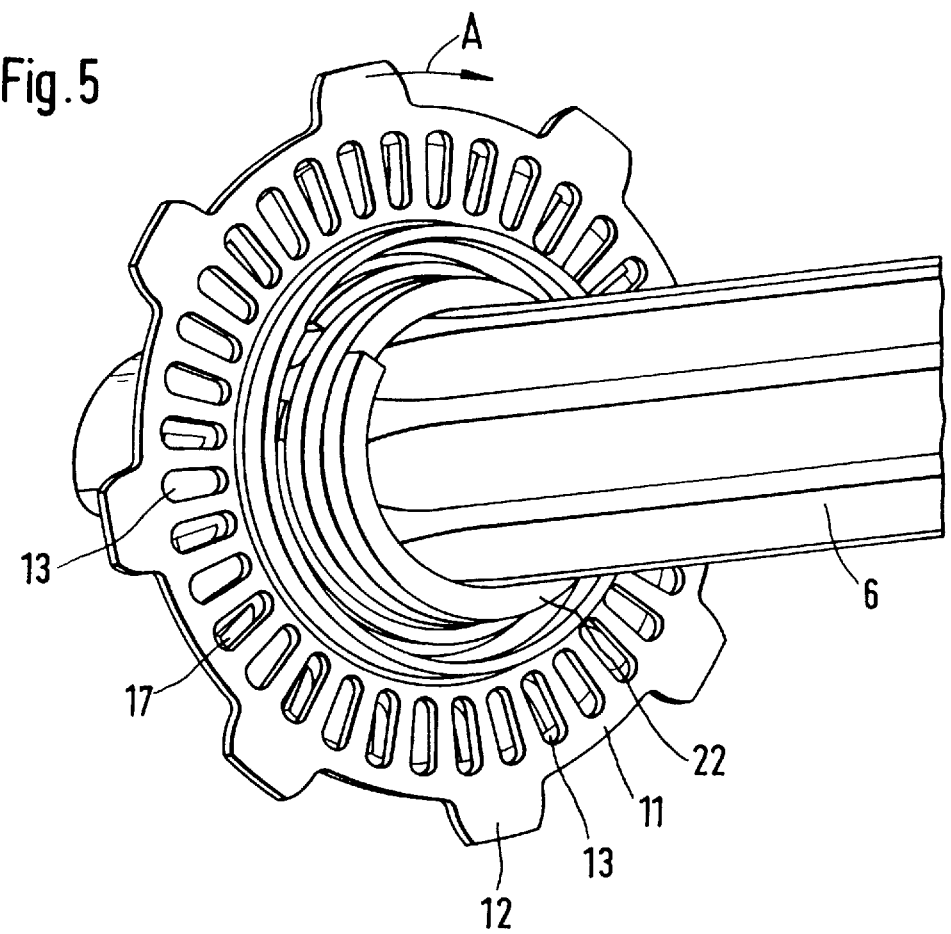
FIG. 5 is an illustration pursuant to FIG. 4 with the addition of a first notch element.

As shown in FIG. 5, the first notch element 11 can include notch windows 13 on substantially the entire circumference of first notch element 11. The notch windows 13 can have substantially the same pitch as the teeth 17 on the second notch element 16. The first notch element 11, which first notch element 11 can be centered on the notch ring 20, can be pressed against the second notch element 16 by a spring 19. The spring 19 can support itself on the driving link 7, as a result of which spring 19 the teeth 17 can engage with the notch windows 13.

Figure 6:
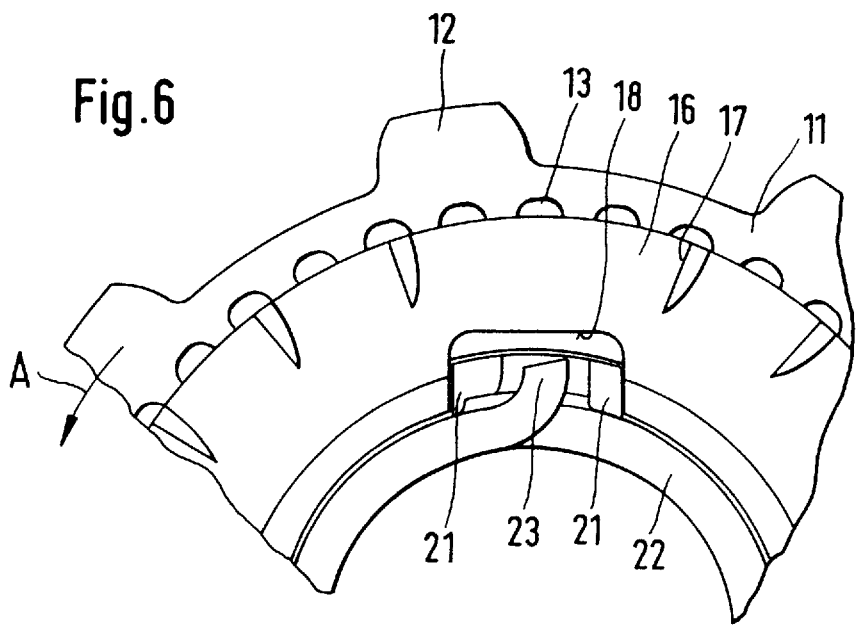
FIG. 6 is an illustration of the freewheel with a first and a second notch element, as well as their effect on a hook of the friction spring, in a longitudinal view.

FIG. 6 shows the second notch element 16 with opening 18, and the two noses 21 of the notch ring 20. The noses 21 take the hook 23 between each corresponding one of the two noses 21. The noses 21 can catch the friction spring 22 with a rotary motion. Catching in the driving sense of rotation A cannot take place, however, since the studs or the material between the notch windows 13 of the first notch element 11 can slide on the inclines 17b of the teeth 17 of the second notch element 16 and have the first notch element 11 give way against the spring 19. Although the friction spring 22, preferably designed as an annular spring, can have relatively low resistance in the driving direction of a rotary motion, this resistance can still be many times higher than the resistance of the freewheel, generated by the first notch element 11 and the second notch element 16 in the driving sense of rotation.

With a rotary motion opposite the driving sense of rotation A, however, forces run over the now locking freewheel between the first notch element 11 and the second notch element 16. The forces can correspond to the torque that is developed by the tightly drawing friction spring 22 on the axle 6. The adjusting force, preferably necessary to have the rolls 8 climb on the ascending surface profile 7a for generating a radial force, can preferably be induced by the-cage ring 9 and cage arms 10, passed on to the catches 12 of the first notch element 11, and then forwarded from the studs between the notch windows 13 to the radial edges 17a of the teeth 17 on the second notch element 16. The boundary of the opening 18 can forward the force to one of the noses 21, and thus to the hook 23 of the friction spring 22. As a result, braking power can be generated.

In other words, for a possible embodiment of the present invention, by back-pedalling or back-rotating (that is, driving the driving link 7 in a direction opposite to the driving direction of rotation A), the rollers 8 can wedge against the cam profiles 7a and the output driving link 2. The wedging of the rollers 8 can generate a radial force to press the output link 2, which output link 2 can preferably be realized as a brake jacket, against the hub sheath 3 to brake the bicycle. The torque generated by the braking contact of the output link 2 with the hub sheath 3 can be transmitted to the axle 6 via the freewheel or freewheel device that can include the first notch element 11 and the second notch element 16.

Upon back-pedalling, the first notch element 11 can non-rotatably engage or connect to the second notch element 16, as the teeth 17a of the second notch element 16 can each engage against the sides of the corresponding windows 13 of the first notch element 11. The second notch element 16 therefore can cooperatively back-pedal or back-rotate with the first notch element 11. The second notch element 16 can be non-rotatably connected to the hook 23 of friction spring 22, via the sides of opening 18 preferably engaging the noses 21 of the notch ring 20. Therefore, cooperative back-pedalling of the second notch element 16 can rotate the second notch element 16 about the axle 6, and can rotate the hook 23 about the axle in the same direction.

The rotation of the hook 23 caused by the back-pedalling can tighten the friction spring 22 around the axle 6. The friction spring 22 can be tightened sufficiently about the axle 6 so that the friction spring 22 can in effect be fixed to the axle 6, and the friction forces generated between the friction spring 22 and the axle 6 can transmit the braking torque generated between the hub sheath 3 and the output link 2 to the axle 6. The braking torque or braking power can be transmitted between the output link 2 and the friction spring 3 by the first and second notch elements 11 and 16 of the freewheel.

The operation of the friction spring 22 can, for a possible embodiment of the present invention, be likened to a line coiled or wrapped about a post or piling (for mooring a ship, for example). As the moored ship attempts to move relative to the post, the ship can apply force to tension to the line, tightening the wrapped line about the post. If the line does not initially slip off the post in response to the force applied by the ship, the line can tighten around the post. The increasing force applied by the tightening line can make it more and more unlikely that the line can slip off the post while under load, because greater and greater frictional forces opposing slip can be generated between the line and the capstan, and between coils of the line itself. Similarly, the tightening of the friction spring 22 about the axle 6 when back-pedalling can create a substantially slip-free connection between the friction spring 22 and the axle 6 during braking.

In other possible embodiments of the present invention, the friction spring 22 can create a substantially slip-free connection to a torque output member to transmit driving torque, rather than braking torque, to a wheel mounted on a bicycle hub.

In order to substantially ensure that the two notch elements 11 and 16 can stay in their stipulated level at an angle to the center axis of the axle 6, a disk 24 can be placed on a retaining ring 25. Against the retaining ring 25, the two disks 11 and 16 can support themselves against the force of the springs 19.

Designing this freewheel, which freewheel can for a possible embodiment be designed in the form of ratchets, can offer the advantage of relatively low friction to oppose the drive torque of the bicyclist in the driving sense of rotation A.

One feature of the invention resides broadly in the friction device for controlling a clamping roller coupling for a drive device or for a back-pedal brake device 1 in connection with bicycle hubs, including a driving link 7 with an ascending surface profile 7a which driving link is placed around an axle 6, at least one roll 8, a cage ring 9 which is connected to the axle 6 by a friction spring 22, distinguished in that between the friction spring 22, on the one hand, which is designed, e.g., as a loop spring and is active in both senses of rotation, and the cage ring 9, on the other hand, a freewheel is placed which idles in one sense of rotation and catches in the other sense of rotation.

Another feature of the invention resides broadly in the friction device distinguished in that the freewheel is formed by a first notch element 11 that is connected to the cage ring 9, a second notch element 16 that is connected to the friction spring 22, and a spring 19.

Yet another feature of the invention resides broadly in the friction device distinguished in that the first notch element 11 is connected, unable to turn, to at least one cage arm 10 of the cage ring 9 by catches 12 and is held in a permanent contact connection to the second notch element 16 by means of a spring 19.

Still another feature of the invention resides broadly in the friction device distinguished in that, by means of a notch ring 20, the second notch element 16 is connected, unable to turn, to the end of the friction spring 22 that is designed as a hook 23.

Examples of back-pedal brake devices for bicycles that could be adapted for use in accordance with the present invention, and which back-pedal brake devices could illustrate other components that could be used with the present invention, could be disclosed by the following U.S. Pat. Nos.: 5,054,594, 4,856,629 and 4,638,890.

Examples of multiple-gear drive devices and multiple-gear hubs for bicycles that could be adapted for use in accordance with the present invention, and which multiple-gear drive devices and multiple-gear hubs could illustrate other components that could be used with the present invention, could be disclosed by the following U.S. Patents, each assigned to the assignee of the present invention: U.S. Pat. Nos. 5,540,0456, 5,527,230, 5,443,279, 5,399,128, 4,973,297 and 4,721,013.

Other examples of multiple-gear drive devices and multiple-gear hubs for bicycles that could be adapted for use in accordance with the present invention, and which multiple-gear drive devices and multiple-gear hubs could illustrate other components that could be used with the present invention, could be disclosed by the following U.S. Pat. Nos.: 5,322,487, 5,273,500, 5,078,664 and 4,926,714.

Examples of friction springs that could possibly be adapted for use in the context of the present invention, and components generally used with friction springs, could be disclosed by the following U.S. Pat. Nos.: 5,373,784, 5,080, 298; 4,957,028 and 4,917,324.

Examples of shifters and shift mechanisms for multiple-gear hubs for bicycles that could possibly be adapted for use in the context of the present invention, and components generally associated with shifters, could be disclosed by the following U.S. Patents and U.S. patent applications, each assigned to the assignee of the present invention: U.S. Pat. Nos. 5,588,925, 5,556,354, Ser. No. 08/688,834, Ser. No. 08/610,665, Ser. No. 08/610,651, Ser. No. 08/610,620 and Ser. No. 08/566,284.

Examples of multiple sprocket sets and components generally associated with multiple sprocket sets that could possibly be adapted for use in the context of the present invention, and components generally associated with multiple sprocket sets could be disclosed by the following U.S. Patents and U.S. patent applications, each assigned to the assignee of the present invention: U.S. Pat. Nos. 5,522,611, 5,503,598, Ser. No. 08/805,078, Ser. No. 08/797,579 and Ser. No. 08/653,955.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 196 17 732.4, filed on May 3, 1996, having inventors Gerhard Meier-Burkamp and Karl-Joachim Kühne, and DE-OS 196 17 732.4 and DE-PS 196 17 732.4, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicants' option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A bicycle multiple-gear hub having a back-pedal brake, said hub comprising:

a torque input member to receive torque from a pedal of a bicycle;

a torque output member to transmit torque to a bicycle wheel mounted on said hub;

a back-pedal brake to brake a bicycle wheel mounted on said hub;

said back-pedal brake comprising:

a clamping roller coupling to transmit torque between said torque input member and said torque output member;

a freewheel;

a freewheel engage and release mechanism to selectively engage and release said freewheel and said clamping roller with one another;

a spring configured and disposed to transmit torque between said torque input member and said torque output member; and said freewheel being disposed between said spring and said freewheel engage and release mechanism.

2. The bicycle multiple-gear hub according to claim 1, wherein:

said clamping roller coupling comprises a driving member;

said driving member is configured to rotate about an axle of a bicycle;

said driving member is connected to said input torque member;

said freewheel engage and release mechanism comprises a ring-shaped member;

said ring-shaped member is configured to rotate about an axle of a bicycle; and said ring-shaped member is non-rotatably connected to said driving member of said clamping roller coupling.

3. The bicycle multiple-gear hub according to claim 2, wherein:

said spring is a loop spring;

said loop spring is configured to be disposed about an axle of a bicycle; and said loop spring is configured and disposed to non-rotatably connect said freewheel and an axle of a bicycle upon engagement of said freewheel and said clamping roller coupling with one another.

4. The bicycle multiple-gear hub according to claim 3, wherein:

said freewheel comprises a first ring-shaped element;

said first ring-shaped element is configured to rotate about an axle of a bicycle;

said first ring-shaped element is non-rotatably connected to said ring-shaped member of said freewheel engage and release mechanism;

said freewheel comprises a second ring-shaped element;

said second ring-shaped element is configured to rotate about an axle of a bicycle;

said second ring-shaped element is non-rotatably connected to said loop spring;

said torque input member is configured to rotate in a forward-pedal direction of rotation about an axle of a bicycle to drive a bicycle, and to rotate in a back-pedal direction of rotation about an axle of a bicycle to brake a bicycle; and each of said first and second ring-shaped elements are configured and disposed to engage with one another upon rotation of said torque input member in a back-pedal direction of rotation to engage said freewheel, and to disengage from one another upon rotation of said torque input member in a forward-pedal direction to disengage said freewheel.

5. The bicycle multiple-gear hub according to claim 4, wherein:

said loop spring is a first spring;

said freewheel comprises a second spring;

said first ring-shaped element and said second ring-shaped element are disposed adjacent one another;

said second spring is configured to be disposed about an axle of a bicycle; and said second spring is configured and disposed to urge said first ring-shaped element against said second ring-shaped element.

6. The bicycle multiple-gear hub according to claim 5, wherein:

said driving member of said clamping roller coupling is disposed between said ring-shaped member and said first ring-shaped element;

said clamping roller coupling comprises a driven member;

said driven member is configured to rotate about an axle of a bicycle;

said driven member is disposed about said driving member;

said clamping roller coupling comprises a plurality of rollers;

each of said plurality of rollers is disposed between said driven member and said driving member of said clamping roller coupling to engage and disengage said driven member and said driving member with one another;

said ring-shaped member comprises an outer portion;

said ring-shaped member comprises a plurality of arms;

each of said plurality of arms extends from said outer portion of said ring-shaped member to said first ring-shaped element;

each of said plurality of arms is disposed between two adjacent ones of said plurality of rollers to non-rotatably connect said ring-shaped member and said driving member to one another;

said first ring-shaped element comprises an outer portion;

said first ring-shaped element comprises a plurality of tabs;

each one of said plurality of tabs extends outward from said outer portion of said first ring-shaped element; and each one of said plurality of arms of said ring-shaped member is disposed between two adjacent ones of said plurality of tabs of said first ring-shaped element to non-rotatably connect said ring-shaped member and said first ring-shaped element with one another.

7. The bicycle multiple-gear hub according to claim 6, wherein said second spring is configured and disposed to urge said first ring-shaped element to engage said second ring-shaped element upon said torque input member being rotated in the back-pedal direction of rotation.

8. The bicycle multiple-gear hub according to claim 7, wherein:

said ring-shaped member is a first ring-shaped member;

said loop spring comprises an end portion;

said end portion of said loop spring is hook-shaped;

said back-pedal brake further comprises a second ring-shaped member;

said second ring-shaped member is configured to be disposed about an axle of a bicycle;

said second ring-shaped member is disposed about at least a portion of said loop spring;

said second ring-shaped member comprises a notch disposed adjacent said loop spring;

said end portion of said loop spring is disposed in said notch to non-rotatably hook and connect said loop spring and said second ring-shaped member with one another; and said second ring-shaped member is non-rotatably connected to said second ring-shaped element to non-rotatably connect said second ring-shaped member and said loop spring with one another.

9. The bicycle multiple-gear hub according to claim 8, wherein:

each of said first and second ring-shaped elements is disposed to rotate about a common axis of rotation;

said first ring-shaped element comprises a first side and an axially opposite second side;

said first ring-shaped element comprises at least one opening;

said at least one opening extends between said first and second sides of said first ring-shaped element;

said second ring-shaped element comprises a first side and an axially opposite second side;

said first side of said second ring-shaped element is disposed adjacent said first ring-shaped element;

said second ring-shaped element comprises at least one tooth;

said at least one tooth extends from said second ring-shaped element towards said first ring-shaped element;

said at least one tooth comprises a first surface and a second surface;

said first surface of said at least one tooth is configured and disposed to engage said at least one opening of said first ring-shaped element to non-rotatably connect said first and second ring-shaped elements with one another upon said first ring-shaped element being rotated in the back-pedal direction of rotation; and said second surface of said at least one tooth is configured and disposed to rotatably connect said first and second ring-shaped elements with one another upon said first ring-shaped element being rotated in the forward-pedal direction of rotation.

10. The bicycle multiple-gear hub according to claim 9, wherein:

said driving member of said clamping roller coupling comprises an outer surface disposed adjacent said driven member of said clamping roller coupling;

said outer surface of said driving member comprises a plurality of cam profiles;

each one of said plurality of rollers of said clamping roller coupling is disposed between a corresponding one of said plurality of cam profiles and said driven member;

each one of said plurality of cam profiles is configured and disposed to wedge said corresponding one of said plurality of rollers between said driving member and said driven member upon said driving member being rotated in the back-pedal direction; and each one of said plurality of cam profiles is configured and disposed to release said corresponding one of said plurality of rollers between said driving member and said driven member upon said driving member being rotated in the forward-pedal direction.

11. A bicycle multiple-gear hub having a drive device, said hub comprising:

a torque input member to receive torque from a pedal of a bicycle;

a torque output member to transmit torque to a bicycle wheel mounted on said hub;

a drive device to drive a bicycle wheel mounted on said hub;

said drive device comprising:
a clamping roller coupling to transmit torque between said torque input member and said torque output member;
a freewheel;
a freewheel engage and release mechanism to selectively engage and release said freewheel and said clamping roller with one another;
a spring configured and disposed to transmit torque between said torque input member and said torque output member; and
said freewheel being disposed between said spring and said freewheel engage and release mechanism.

12. The bicycle multiple-gear hub according to claim 11, wherein;

said spring is a loop spring;

said torque input member is configured to rotate in a forward direction of rotation about an axle of a bicycle to drive a bicycle wheel mounted on said hub; and said loop spring is configured and disposed to non-rotatably connect said torque input member and said torque output member with one another upon said torque input member being rotated in the forward direction of rotation.

13. The bicycle multiple-gear hub according to claim 12, wherein:

said clamping roller coupling comprises a driving member;

said driving member is configured to rotate about an axle of a bicycle;

said driving member is connected to said input torque member;

said freewheel engage and release mechanism comprises a ring-shaped member;

said ring-shaped member is configured to rotate about an axle of a bicycle; and said ring-shaped member is non-rotatably connected to said driving member of said clamping roller coupling.

14. The bicycle multiple-gear hub according to claim 13, wherein:

said freewheel comprises a first ring-shaped element;

said first ring-shaped element is configured to rotate about an axle of a bicycle;

said first ring-shaped element is non-rotatably connected to said ring-shaped member of said freewheel engage and release mechanism;

said freewheel comprises a second ring-shaped element;

said second ring-shaped element is configured to rotate about an axle of a bicycle;

said second ring-shaped element is non-rotatably connected to said loop spring;

said torque input member is further configured to rotate in a back-pedal direction of rotation about an axle of a bicycle; and each of said first and second ring-shaped elements are configured and disposed to engage with one another upon rotation of said torque input member in a forward-pedal direction of rotation to engage said freewheel, and to disengage from one another upon rotation of said torque input member in a back-pedal direction to disengage said freewheel.

15. The bicycle multiple-gear hub according to claim 14, wherein:

said loop spring is a first spring;

said freewheel comprises a second spring;

said first ring-shaped element and said second ring-shaped element are disposed adjacent one another;

said second spring is configured to be disposed about an axle of a bicycle; and said second spring is configured and disposed to urge said first ring-shaped element against said second ring-shaped element.

16. The bicycle multiple-gear hub according to claim 15, wherein:

said driving member of said clamping roller coupling is disposed between said ring-shaped member and said first ring-shaped element;

said clamping roller coupling comprises a driven member;

said driven member is configured to rotate about an axle of a bicycle;

said driven member is disposed about said driving member;

said clamping roller coupling comprises a plurality of rollers;

each of said plurality of rollers is disposed between said driven member and said driving member of said clamping roller coupling to engage and disengage said driven member and said driving member with one another;

said ring-shaped member comprises an outer portion;

said ring-shaped member comprises a plurality of arms;

each of said plurality of arms extends from said outer portion of said ring-shaped member to said first ring-shaped element;

each of said plurality of arms is disposed between two adjacent ones of said plurality of rollers to non-rotatably connect said ring-shaped member and said driving member to one another;

said first ring-shaped element comprises an outer portion;

said first ring-shaped element comprises a plurality of tabs;

each one of said plurality of tabs extends outward from said outer portion of said first ring-shaped element; and each one of said plurality of arms of said ring-shaped member is disposed between two adjacent ones of said plurality of tabs of said first ring-shaped element to non-rotatably connect said ring-shaped member and said first ring-shaped element with one another.

17. The bicycle multiple-gear hub according to claim 16, wherein:

said second spring is configured and disposed to urge said first ring-shaped element to engage said second ring-shaped element upon said torque input member being rotated in the forward-pedal direction of rotation.

18. The bicycle multiple-gear hub according to claim 17, wherein:

said ring-shaped member is a first ring-shaped member;

said loop spring comprises an end portion;

said end portion of said loop spring is hook shaped;

said drive device further comprises a second ring-shaped member;

said second ring-shaped member is configured to be disposed adjacent at least a portion of said loop spring;

said second ring-shaped member comprises a notch disposed adjacent said loop spring;

said end portion of said loop spring is disposed in said notch to non-rotatably hook and connect said loop spring and said second ring-shaped member with one another; and said second ring-shaped member is non-rotatably connected to said second ring-shaped element to non-rotatably connect said second ring-shaped member and said loop spring with one another.

19. The bicycle multiple-gear hub according to claim 18, wherein:

each of said first and second ring-shaped elements is disposed to rotate about a common axis of rotation;

said first ring-shaped element comprises a first side and an axially opposite second side;

said first ring-shaped element comprises at least one opening;

said at least one opening extends between said first and second sides of said first ring-shaped element;

said second ring-shaped element comprises a first side and an axially opposite second side;

said first side of said second ring-shaped element is disposed adjacent said first ring-shaped element;

said second ring-shaped element comprises at least one tooth;

said at least one tooth extends from said second ring-shaped element towards said first ring-shaped element;

said at least one tooth comprises a first surface and a second surface;

said first surface of said at least one tooth is configured and disposed to engage said at least one opening of said first ring-shaped element to non-rotatably connect said first and second ring-shaped elements with one another upon said first ring-shaped element being rotated in the forward-pedal direction of rotation; and said second surface of said at least one tooth is configured and disposed to rotatably connect said first and second ring-shaped elements with one another upon said first ring-shaped element being rotated in the back-pedal direction of rotation.

20. The bicycle multiple-gear hub according to claim 19, wherein:

said driving member of said clamping roller coupling comprises an outer surface disposed adjacent said driven member of said clamping roller coupling;

said outer surface of said driving member comprises a plurality of cam profiles;

each one of said plurality of rollers of said clamping roller coupling is disposed between a corresponding one of said plurality of cam profiles and said driven member;

each one of said plurality of cam profiles is configured and disposed to wedge said corresponding one of said plurality of rollers between said driving member and said driven member upon said driving member being rotated in the forward-pedal direction; and each one of said plurality of cam profiles is configured and disposed to release said corresponding one of said plurality of rollers between said driving member and said driven member upon said driving member being rotated in the back-pedal direction.

* * * * *